United States Patent [19]

Martinola

[11] 4,400,278
[45] Aug. 23, 1983

[54] COUNTER-CURRENT ADSORPTION FILTERS FOR THE TREATMENT OF LIQUIDS AND A METHOD OF OPERATING THE FILTER

[75] Inventor: Friedrich Martinola, Cologne, Fed. Rep. of Germany

[73] Assignee: Bayer Aktiengesellschaft, Leverkusen, Fed. Rep. of Germany

[21] Appl. No.: 309,614

[22] Filed: Oct. 1, 1981

[30] Foreign Application Priority Data

Oct. 29, 1980 [DE] Fed. Rep. of Germany ....... 3040616

[51] Int. Cl.³ .............................................. C02F 1/42
[52] U.S. Cl. ................................... 210/678; 210/264; 210/266; 210/275; 210/283; 210/290
[58] Field of Search ............... 210/660, 661, 670, 284, 210/678, 686, 264, 266, 283, 289, 290, 275, 279, 293

[56] References Cited

U.S. PATENT DOCUMENTS

| | | | |
|---|---|---|---|
| 2,666,741 | 1/1954 | McMullen | 210/686 |
| 2,708,519 | 5/1955 | Novak | 210/264 |
| 2,776,258 | 1/1957 | Gilliland | 210/686 |
| 3,208,833 | 9/1965 | Carson | 210/264 |
| 3,458,439 | 7/1969 | Schmidt | 210/678 |
| 3,527,718 | 9/1970 | Coburn | 210/686 |
| 3,664,950 | 5/1972 | Saraceno | 210/678 |
| 3,875,053 | 4/1975 | Siegers | 210/678 |
| 3,956,128 | 5/1976 | Turner | 210/290 |
| 4,321,145 | 3/1982 | Carlson | 210/678 |
| 4,329,225 | 5/1982 | Davis | 210/678 |

FOREIGN PATENT DOCUMENTS 230587 10/1960 Australia ............................ 210/678

Primary Examiner—Ernest G. Therkorn
Attorney, Agent, or Firm—Sprung, Horn, Kramer & Woods

[57] ABSTRACT

The invention concerns a counter-current adsorption filter for the treatment of liquids, with different adsorbents which require different regenerating agents, in which loading of the different adsorbents is effected in a stream of liquid flowing upwards and regeneration of the different loaded adsorbents with the different regenerating agents is effected in a stream of liquid flowing downwards, the inside of which filter is subdivided, by horizontal devices which are permeable to liquid, into a number of chambers corresponding to the number of different adsorbents to be used; in which the adsorbents which are regenerated with different regenerating agents are present in adjacent chambers; the chambers—with the exception of the topmost chamber of the filter—are equipped with a liquid drainage system which is located below the device which is permeable to liquid and forms the upper boundary of the chamber, and which is embedded in a layer of inert material; and in which the individual chambers are filled with a certain amount of adsorbent. The invention furthermore concerns a process for the operation of this letter.

8 Claims, 2 Drawing Figures

COUNTER-CURRENT ADSORPTION FILTERS FOR THE TREATMENT OF LIQUIDS AND A METHOD OF OPERATING THE FILTER

Adsorption filters which operate by the counter-current principle and processes for the treatment of liquids, in which loading of the adsorbent is effected in a stream of liquid flowing upwards and regeneration of the loaded adsorbent is effected in a stream of liquid flowing downwards, are already known (see e.g. U.S. Pat. No. 3,458,436). However, in these known adsorption filters, two or more adsorbents are only used if they can be regenerated with the same regenerating agent (see, for example, VGB Kraftwerkstechnik 59 (1979), 1. 69/71).

If the treatment of the liquids requires the use of two or more adsorbents which must be regenerated with different regenerating agents, for example anionic and cationic exchangers in the complete demineralisation of water, the adsorbents which are regenerated with different regenerating agents are filled into separate adsorption filters and these filters are connected in series. That is to say, the use of adsorbents which are to be regenerated with different regenerating agents necessitates an installation consisting of several separate filters.

However, it requires a great deal of technical effort to connect several filters in series. There was therefore the industrial problem of providing an adsorption filter, for use in the said counter-current process, in which different adsorbents which must be regenerated with different regenerating agents can be used and in which these different adsorbents can be not only loaded but also regenerated.

The use of different adsorbents requiring different regenerating agents within one filter is known from the art of mixed bed filters (see, for example, U.S. Pat. No. 2,666,741 and French Application No. 2,314,896). However, these mixed bed filters are only operated in co-current, with loading and regeneration in a stream of liquid flowing downwards. Mixed beds cannot be used in the counter-current process in question, independently of whether they are used with or without separating layers, because the intimate mixtures of cation exchangers and anion exchangers or —in the case of mixed beds with a separating layer—of cation exchangers and anion exchangers and inert resins, present during the loading of mixed beds must be separated into their components for regeneration. This separation leads to a complete rearrangement (swirling) of the adsorbent bed present during loading. Precisely this rearrangement must, however, be avoided in the counter-current process. The counter-current process requires regeneration of the loaded adsorbent bed without rearrangement.

Similar statements apply to the adsorption filter described in European Application 2,342. Different adsorbents which are to be regenerated with different regenerating agents are also used in this filter. The device is recommended for adsorption processes in which loading and regeneration are effected in a stream of liquid flowing downwards. For regeneration, the adsorbents are removed from the filter. Because of the necessity of regenerating the loaded adsorbents outside the filter, the device cannot be used for the counter-current process in question. Compared with counter-current filters, the mixed bed filters have the disadvantage of longer washing out times and a greater requirement of regenerating agent.

It has now been found that the counter-current process in which loading is effected in a stream of liquid flowing upwards and regeneration is effected in a stream of liquid flowing downwards can also be carried out in one filter using adsorbents which require different regenerating agents, if the adsorption filter is subdivided, by means of horizontal devices which are permeable to liquid, into as many chambers as there are different adsorbents to be used in the filter, the resulting chambers, with the exception of the topmost chamber, are equipped with a liquid drainage system which is located below the device which is permeable to liquid, and which is embedded in a layer of inert material and the chambers are filled with certain amounts of adsorbent.

If an adsorption filter constructed in this manner is operated by a procedure in which, in the loading phase, the liquid to be treated is allowed to flow through the filter from the bottom upwards and, in the regeneration phase, the adsorbent is regenerated one chamber at a time by introducing the regenerating agent and washing water into the top of the chamber to be regenerated and simultaneously removing the spent regenerating agent and the washing water through the liquid drainage system of the chamber below with a stream of water passed through the chamber below from the bottom upwards, in counter-current to the stream of regenerating agent and washing water, it is possible, using adsorbents which require different regenerating agents, to carry out the complete operation of the counter-current process, that is to say charging and regeneration, in one and the same filter body.

The invention thus relates to a counter-current adsorption filter for the treatment of liquids with different adsorbents which require different regenerating agents, in which loading of the different adsorbents is effected in a stream of liquid flowing upwards and regeneration of the different laden adsorbents with the different regenerating agents is effected in a stream of liquid flowing downwards; the adsorption filter is characterised in (a) that the inside of the filter is sub-divided, by horizontal devices which are permeable to liquid, into a number of chambers corresponding to the number of different adsorbents to be used; (b) that adsorbents which are regenerated with different regenerating agents are present in adjacent chambers; (c) that the chambers—with the exception of the topmost chamber of the filter—are equipped with a liquid drainage system which is located below the device which is permeable to liquid and forms the upper boundary of the chamber, and which is embedded in a layer of inert material; and (d) that the amount of adsorbent (in % by volume) in the individual chambers is 50 to 98%, preferably 60 to 95% and particularly preferably 75 to 95%, of the free volume of the chamber.

The invention furthermore relates to a method of operating the counter-current adsorption filter according to the invention; the method is characterised in that, in the loading phase, the stream of liquid to be treated is passed from the bottom upwards through the chambers of the filter which are filled with the different adsorbents and are arranged one on top of the other; and in the regeneration phase the loaded adsorbents are regenerated chamber by chamber by a procedure in which regenerating agent and washing water are introduced into the top of that chamber of which the adsorbent is to be regenerated, and spent regenerating agent and washing water are removed via the liquid drainage system of the chamber below simultaneously with a stream of water which flows in counter-current to the stream of spent regenerating agent and washing water and which is being passed from the bottom upwards through this very chamber below.

Non-ionic adsorbents, for example active charcoal or synthetically adsorber resins, such as are described, for example, in U.S. Pat. No. 3,531,463, and in particular ion exchangers are suitable for use in the adsorption filters according to the invention or for use in the counter-current method according to the invention.

The most diverse combinations of these various adsorbents can be used in the adsorption filters according to the invention. The following combinations may be mentioned for illustration: (the sequence in which the adsorbents are listed in the combinations below corresponds to the sequence in which the adsorbents follow one another in the filter. The adsorbent first mentioned in the combinations is in the lowest chamber of the filter, and the adsorbent mentioned last is in the topmost chamber)

Combinations of two adsorbents:
(a) Cation exchanger-anion exchanger
(b) Anion exchanger-cation exchanger
(c) Weakly acid cation exchanger/strongly acid cation exchanger-weakly basic anion exchanger/strongly basic anion exchanger Combinations of three adsorbents:
(a) Adsorber resin (regenerating agent: dilute NaOH)-cation exchanger-anion exchanger
(b) Cation exchanger-adsorber resin (regenerating agent: 10% strength sodium chloride solution)-anion exchanger
(c) Cation exchanger-anion exchanger-cation exchanger
(d) Anion exchanger-cation exchanger-anion exchanger Combinations of four adsorbents:
(a) Cation exchanger-anion exchanger-cation exchanger-anion exchanger The combination of two adsorbents (c) illustrates the case in which a strongly acid and a weakly acid cation exchanger and a strongly basic and a weakly basic anion exchanger can be used instead of a cation exchanger and an anion exchanger. The strongly acid and weakly acid cation exchanger and strongly basic and weakly basic anion exchanger are indeed accommodated in separate chambers arranged one on top of the other, but since the two cation exchangers on the one hand and the two anion exchangers on the other hand are regenerated with the same regenerating agents, a drainage system embedded in the layer of inert material is present only in the chamber containing the strongly acid cation exchangers, because only this chamber lies underneath a chamber which is to be regenerated with a different regenerating agent.

In the context of the adsorption filters according to the invention, devices which are permeable to liquid are to be understood as plates provided with openings (for example nozzles or slots), (that is to say nozzle trays or slotted trays) or gauzes, which are known in the adsorption filter art and are permeable to the liquid but not to the adsorbent.

In the context of the filters according to the invention, liquid drainage systems are to be understood as the drainage systems which are known in the adsorption filter art and are built up, for example, from perforated tubing. These drainage systems are located at as short a distance as possible below the device which is permeable to liquid. The distance is largely determined by the thickness of the drainage tubes. The drainage systems are advantageously in the upper fifth, preferably in the upper seventh, of the chamber in question.

The drainage system is embedded in a layer of inert material. The thickness of the layer of inert material is determined by the thickness of the drainage system. The thicker the drainage system, the thicker also is the layer of inert material, so that the drainage system is embedded. In general, the layer of inert material is 60 to 600 mm thick, preferably 100 to 300 mm thick. Materials which are suitable for the layer of inert material are those which are inert towards the liquids to be treated, the regenerating agents and the washing solutions, that is to say materials which do not react with these media.

The inert materials should have a lower density than the liquids with which they come into contact; that is to say they should float on the liquids flowing through them. The inert materials are preferably used in granular form. Examples of materials which have proved suitable are organic synthetic materials, such as polyethylene, polypropylene and polystyrene. The particle size of the granules should advantageously be about 0.2 to 2.0 mm.

In the context of the invention, "free volume of the chamber" is to be understood as the volume of the chamber minus the volume of inert material+liquid drainage system. Since the topmost chamber of the filter contains no liquid drainage system, in this topmost chamber, the free volume of the chamber is the same as the volume of the chamber.

In order for the adsorbents in the counter-current filters claimed to diaplay their full action during loading in upward flow, it is necessary for a portion of the adsorbent, in particular at least 25% of the adsorbent (% by volume, relative to the volume of adsorbent), to form a fixed bed on the layer of inert material at the flow rates of 5 to 500 m/hour usually used for the liquids to be treated. An adsorbent bed with the desired fixed bed content of at least 25% is obtained, under the given flow rates, with the amounts of adsorbent which are to be used in the chambers according to the claims, which amounts are 50 to 98, preferably 60 to 95, particularly preferably 75 to 95% by volume of the free volume of the chamber.

Figure 1:
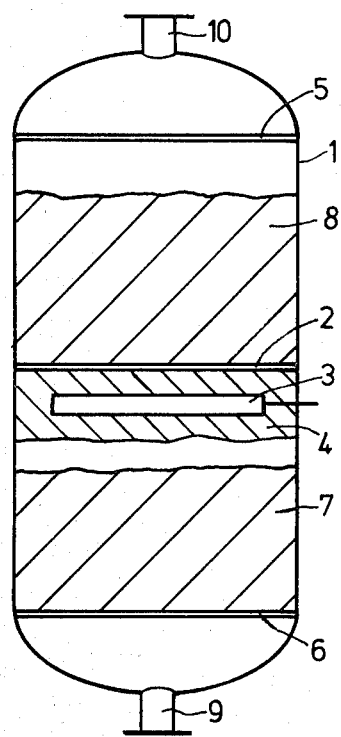
FIG. 1 illustrates the two chamber embodiment of the adsorption filter.

The principle of the adsorption filters according to the invention and their mode of operation may be illustrated with the aid of the two-chamber adsorption filter shown in FIG. 1.

A filter column 1 is divided into two chambers by a device (nozzle tray) 2 which is permeable to liquid. The liquid drainage system (drainage) 3 through which liquid can be supplied and removed without adsorbent particles passing out is directly below the nozzle tray 2. The drainage 3 is embedded in a layer of inert material 4. The inert material permits passage of the various liquids, but keeps the adsorbent particles away from the drainage. The devices (nozzle trays) 5 and 6 which are permeable to liquid form the lower and upper boundary of the filter chamber. The amount of cation exchanger 7 in the lower chamber is about 75% of the free volume of the chamber and the amount of anion exchanger 8 in the upper chamber is about 60% of the chamber volume. Before loading, the cation exchanger is in the H-form and the anion exchanger is in the OH-form. For the treatment of liquids, for example the demineralisation of untreated water, the liquid is introduced into the filter column 1 from the bottom through tube 9, flows through the two exchanger chambers and leaves the filter column at the top through tube 10.

When the two ion exchangers are exhausted, they are regenerated. Regeneration is carried out chamber by chamber, in particular by first feeding the regeneration solution for the anion exchanger 8, that is to say dilute sodium hydroxide solution, into the upper chamber via tube 10 and by removing the regeneration agent which drains out at the drainage 3. At the same time as the regenerating agent solution is fed in, untreated water flows through the cation exchanger 7 from the bottom through tube 9 and leaves at drainage 3, together with the regenerating solution draining out of the upper chamber. The rate of flow of the water passing in counter-current to the regenerating agent through the lower chamber is adjusted so that no schlieren are visible below the layer of inert material 4. This freedom from schlieren can already be achieved with a flow rate of about 1 m/hour.

After the regeneration, the regenerating solution is expelled from the anion exchanger 8 by the introduction of water of an appropriate purity via tube 10. During this washing out operation also, water flows from the bottom through tube 9 at the rate which has already been established.

As soon as the anion exchanger 8 has been washed out, the cation exchanger 7 is regenerated. The regenerating solution (dilute hydrochloric acid) is passed into the chamber through drainage 3 and, after flowing through the exchanger bed, is removed through tube 9. For washing out the cation exchanger 7, water of appropriate purity is fed through drainage 3. As soon as the exchanger has been sufficiently washed out, the filter is operational for renewed charging.

Regeneration of the two chambers does not have to be carried out in the sequence described—first the upper chamber, then the lower chamber—but it is also possible for it to be carried out in the reverse sequence—first the lower, then the upper chamber. It is only essential that, during regeneration of the adsorbent in the upper chamber, the regenerating solution is supplied and removed such that it does not come into contact with the adsorbent present in the chamber below. According to the invention, this is achieved by removing the regenerating agent solutions and washing waters drainage out of the chamber through the drainage located in the chamber below simultaneously with a stream of water passed in counter-current through the lower chamber. The joint action of these measures according to the invention, that is to say the arrangement of a liquid drainage system embedded in a layer of inert material at the top of the lower chamber and the joint removal of the spent regenerating agent solutions and washing water drainage out of the upper chamber and of the stream of water passing through the lower chamber in counter-current to the spent regenerating agent and washing water achieves excellent regeneration of the adsorbent in the upper chamber without the adsorbent in the lower chamber coming into contact with the regenerating agent or washing water from the upper chamber; that is to say, the measures according to the invention make it possible to regenerate two different adsorbents which are to be regenerated with different regenerating agents and are accommodated in adjacent chambers.

If different adsorbents which, however, are treated with the same regenerating agent are present in adjacent chambers, the regenerating agent fed into the upper chamber flows through these chambers successively without being removed in between. Examples of different adsorbents which, however, are regenerated with the same regenerating agent are weakly acid and strongly acid cation exchangers, or weakly basic and strongly basic anion exchangers.

In water treatment, it is frequently necessary for the treated water to flow through the different adsorbents in a certain sequence so that the desired effect of the adsorbents is achieved. As a result, different adsorbents which, however, are regenerated with the same regenerating agent are frequently not located in successive chambers and it is necessary for the chambers containing these adsorbents to be interposed by chambers which contain adsorbents requiring other regenerating agents. Such series arrangements of different adsorbents can be effected simply and economically in the counter-current adsorption filters according to the invention. The principle of such a series arrangement of different adsorbents, some of which are to be regenerated with the same regenerating agent and some of which are to be regenerated with different regenerating agents may be illustrated by the three-chamber filter shown in FIG. 2.

The filter column 1 is divided into three chambers by two nozzle trays 2.1 and 2.2. Below each of these nozzle trays 2.1 and 2.2 is a drainage 3.1 and 3.2. The drainages 3.1 and 3.2 are embedded in layers of inert material 4.1 and 4.2. 7.1 and 7.2 are cation exchangers to be regenerated with the same regenerating agent, and 8 is an anion exchanger.

The adsorbents 7.1, 8 and 7.2 are loaded by introduction of the untreated water through tube 9. The demineralised water is removed at the top of the filter through tube 10.

When loading has ended, the adsorbents in the three chambers are regenerated as follows:

The regenerating agent solution is first passed into the topmost chamber, regenerates the cation exchanger 7.2 in this chamber and, together with the stream of water passed in counter-current from the bottom via drainage 3.1 or tube 9, is removed through drainage 3.2 and collected in the intermediate tank 11. The regenerating agent is then washed out of 7.2, also whilst passing a stream of water in counter-current through drainage 3.1. or tube 9. This washing water is also collected separately.

The anion exchanger 8 in the middle chamber is then regenerated and washed out, both operations being carried out in the manner described for the anion exchanger 8 in FIG. 1. When the adsorbent in the middle chamber is also operational again, the cation exchanger 7.1 in the lowest chamber is regenerated. In particular, the regenerating agent which has been collected in tank 11 and is only partly spent is used for the regeneration. This regenerating agent is passed into the chambers via drainage 3.1 and removed by tube 9. When regeneration has ended, the regenerating agent is expelled first by the washing water obtained during washing out of the cation exchanger 7.2 and then by pure water. As is the case with the regenerating agent, the washing water is passed in through drainage 3.1 and removed through tube 9.

Maximum utilisation of the regenerating agent is achieved by re-using the regenerating agent solution which drains out during regeneration of the cation exchanger 7.2 and the washing water. In principle, this combined regeneration can be applied to all adsorbents.

The filters according to the invention for the first time open up the possibility of using any desired combination of adsorbents in a counter-current adsorption filter in which loading is effected in upward flow and regeneration in downward flow. By choosing appropriate adsorbent combinations, any desired degree of purity of a solution to be treated can be achieved with the filters according to the invention. Moreover, the filters according to the invention also have the advantages that they take up only a small amount of space, enable savings to be made on valves and tubing and, during operation, have only a low pressure loss, since, as a result of the absence of connecting lines and valves, there are no constrictions. In addition, they permit economical combined regeneration and hence a considerable saving in regeneration chemicals and washing water.

EXAMPLE 1

An adsorption filter constructed according to FIG. 1 is used. The filter 1 has an internal diameter of 190 mm and a cylindrical jacket height of 1,200 mm. It has an upper nozzle tray 5, a lower nozzle tray 6 and a middle nozzle tray 2, and a drainage 3. The distance between nozzle trays 6 and 2 is 610 mm and the distance between the nozzle trays 2 and 5 is 475 mm. The volumes of the two chambers are 17.3 l (lower chamber) and 13.5 l (upper chamber). The mean distance from the drainage 3 to the middle nozzle tray 2 is 80 mm. Drainage 3 is embedded in a layer 4 of polyethylene granules (particle size: 1 to 2 mm). The thickness of the layer of inert material is 150 mm and the free volume of the lower chamber is 13 l. The lower chamber is filled with 11.6 l (=89% of the free volume of the chamber) of a strongly acid cation exchanger. The free space between the upper edge of the ion exchanger bed and the layer of inert material is 50 mm. The upper chamber is filled with 11.2 l (=83% of the chamber volume of a strongly basic anion exchanger. The free space between the upper edge of the ion exchanger bed and the nozzle tray 5 is 80 mm.

In order to render the filter operational, the ion exchangers are first regenerated. For this purpose, 18.5 l of 3% strength sodium hydroxide solution are passed through tube 10 over the anion exchanger in the course of 20 minutes, and are simultaneously removed through drainage 3 with the water passed in counter-current through tube 9 (flow rate of the water passed in counter-current through tube 9: 55 l/hour).

The cation exchanger mass is lifted almost to the layer of inert material 4 by the water passed in counter-current. The free space which remains is observed for freedom from schlieren. When the regenerating alkali has been added, it is expelled by passing in demineralised water through tube 10. The washing water which drains out is removed through drainage 3 with the water which is also passed through tube 9 in counter-current during the washing operation. When 50 l of washing water have been passed through, the acid capacity of the solution flowing out at 3 is now only 0.1 mmol/l. Washing is then ended.

The cation exchanger is then regenerated by passing in 9.6 l of 6% strength hydrochloric acid through drainage 3 in the course of 16 minutes. The spent regenerating agent flows out through tube 9. 22 l of demineralised water are passed in through drainage 3 in the course of 19 minutes in order to expel the regenerating solution. The liquid which leaves the filter at 9 then still has a base capacity of only 3.5 mm mmols/l. The washing is then ended.

The filter rendered operational in this manner is used for demineralising drinking water. Drinking water is passed in through tube 9 at a rate of 300 l/hour. The demineralised water leaves through tube 10. The filter run is interrupted when the silica value in the treated water has risen to 0.1 mg of $SiO_2$/l. This is the case after a throughput of 780 l of drinking water.

The average conductivity of the demineralised water is 3.5 microsiemens/cm. The total salt content of the drinking water used for charging is (including silica) 10.2 mmols of exchange equivalents/l. This means that, in the filter run, a useful capacity of the anion exchanger of 0.710 exchange equivalents per 1 of resin is achieved.

Comparative tests:

(a): If drainage 3 is not embedded in the inert material, and instead 15.8 l of cation exchanger are filled into the lower chamber, the cation exchanger rises up to the drainage during regeneration of the anion exchanger. This has the result that a conductivity of only 55 microsiemens/cm can be achieved in the demineralised water during the loading with fresh water which follows regeneration of the resins. The residual silica value varies between 0.12 and 0.25 mg of $SiO_2$/l.

If the stream of water passed in counter-current through tube 9 is introduced so slowly during regeneration and washing out of the anion exchanger that schlieren occur in the free space, a conductivity in the demineralised water of only 35 microsiemens/cm is achieved during subsequent demineralisation of drinking water.

(b): In the filter used, the nozzle tray 2 is removed and the polyethylene granules are replaced by resin granules with a specific gravity between the specific gravity of the cation exchanger and that of the anion exchanger. The filter is filled with a layer of 14.3 l of cation exchanger on the lower tray, a layer of 4.0 l of resin granules on top, and a layer of 11.2 l of anion exchanger on top of that. Drainage 3 is embedded in the inert resin material. Above the anion exchanger is a free space of 1,000 mm, such as is required for back-washing and simultaneous separation of mixed ion exchangers in a mixed bed filter.

Regeneration and washing out of the anion exchanger and of the cation exchanger are carried out with the abovementioned amounts of regenerating agents and washing water, the given flow rates being maintained. The filter is then loaded with drinking water by passing in, from the bottom upwards, an amount of 300 l/hour through tube 9. The volume of the resin thereby increases by 60%. In addition, swirling and mixing of the three different materials occur.

The average conductivity of the water on leaving through tube 10 is 215 microsiemens/cm, and the residual silica content is 0.55 mg of $SiO_2$/l. The amount of demineralised water which can be passed through before the residual silica content rises to 1 mg of $SiO_2$/l is 510 l, corresponding to a useful capacity of the anion exchanger of 0.46 exchange equivalent per 1 of resin.

EXAMPLE 2

The filter according to the invention, described in Example 1, is used for complete demineralisation of partly demineralised water. Composition of the partly demineralised water:

| alkaline earth metals | 0 |
| --- | --- |
| sodium | 3 mg/l |
| chloride | 5 mg/l |
| sulphate | 0 |
| carbon dioxide ($CO_2$) | 22 mg/l |
| silica ($SiO_2$) | 12 mg/l |
| pH value | 5.5 |
| conductivity | 25 microsiemens/cm |

The partly demineralised water is introduced into the regenerated filter through tube 9 at a rate of 500 l/hour. The completely demineralised water leaving through tube 10 has the following values:

| sodium | 0.03 mg/l |
| --- | --- |
| chloride, sulphate and carbon dioxide | 0 |
| silica ($SiO_2$) | 0.01 mg/l |
| pH value | 7.1 |
| conductivity | 0.12 microsiemens/cm |

28 l of 4% strength sodium hydroxide solution and 19.2 l of 6% strength hydrochloric acid are required as regenerating agents in order to produce a water of the same purity using a mixed bed filter containing the same amounts and types of resin. Furthermore, 305 l of water are required for separating the resins, expelling the regenerating agents and washing out the filter after the mixing operation. That is to say, the mixed bed filter requires an excess of regenerating agent 100% higher than that required by the filter according to the invention. In addition, the washing water requirement of the mixed bed filter is 320% greater than that of the filter according to the invention.

EXAMPLE 3

The filter, according to the invention, described in Example 1 is used for demineralising a condensate. The condensate has the following values:

| iron (Fe) | 0.022 mg/l |
| --- | --- |
| sodium | 0.012 mg/l |
| ammonia ($NH_3$) | 0.85 mg/l |
| silica ($SiO_2$) | 0.02 mg/l |
| pH value | 9.2 |
| conductivity | 5.2 microsiemens/cm |
| temperature | 42 °C. |

The condensate was passed through the filter at a rate of 750 l/hour.

The regenerating agent amounts mentioned in Example 1 are used for regenerating the loaded exchangers. The washing water consumption is 105 l, pumping being carried out for 2 hours.

The water leaving the filter has the following values:

| iron | 0.002 mg/l |
| --- | --- |
| sodium | 0.033 mg/l |
| ammonia ($NH_3$) | 0.012 mg/l |
| silica ($SiO_2$) | 0.006 mg/l |
| pH value | 7.3 |
| conductivity | 0.09 microsiemens/cm |

Twice the amount of regenerating agents and at least three times the amount of washing water, even if this is pumped round, as in the filter according to the invention, are required to produce a water of the same purity using a mixed bed filter of the customary construction and with internal regeneration, containing the same amounts and types of resin.

EXAMPLE 4

The filter described in Example 1 is used, but, in this filter, the cation exchanger is now located in the upper chamber and the anion exchanger is in the lower chamber. The filter is rendered operational with the amounts of regenerating agents (hydrochloric acid and sodium hydroxide solution) and washing water mentioned in Example 1. In this case, regeneration is started with the cation exchanger in the upper chamber. The hydrochloric acid solution was passed in through tube 10 and removed through the drainage 3 at the same time as the stream of water passed in counter-current through tube 9. The procedure is otherwise as described in Example 1.

The regenerated filter is used for purification of the condensate described in Example 3. This condensate is passed through the filter at a rate of 750 l/hour. The pure condensate taken off at tube 10 has a residual sodium content of 0.001 mg/l. 268 $m^3$ of condensate can be passed through before the cation exchanger is exhausted (time: 14 days).

A comparable mixed bed filter is already exhausted after a throughput of 150 $m^3$ of condensate, and twice the amount of regenerating agent is required for the regeneration.

EXAMPLE 5

Figure 2:
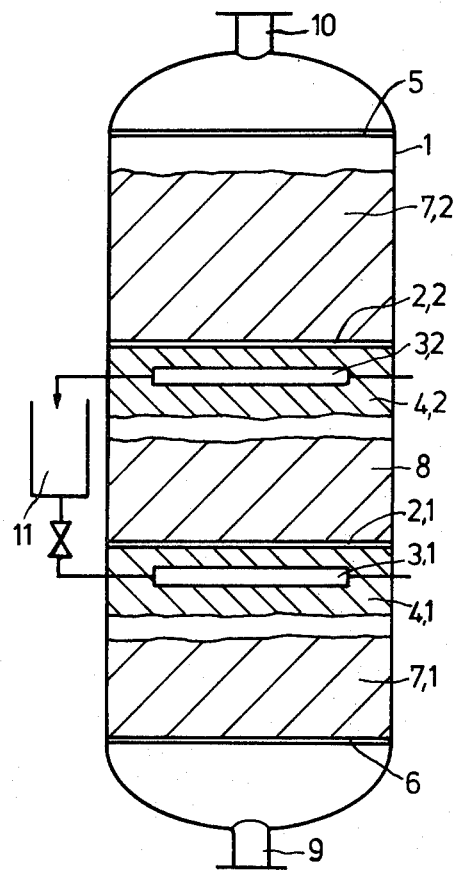
FIG. 2 illustrates the three chamber embodiment of the adsorption filter.

A filter constructed according to FIG. 2 is used. The filter 1 has an internal diameter of 190 mm and a cylindrical jacket height of 1,800 mm. The filter is provided with an upper nozzle tray 5, a lower nozzle tray 6 and two middle nozzle trays 2.2 and 2.1 and two drainages 3.2 and 3.1. The distance between the nozzle trays 6 and 2.1 is 610 mm, the distance between the nozzle trays 2.1 and 2.2 is 625 mm and the distance between the nozzle trays 2.2 and 5 is 330 mm. The volumes of the three chambers are: lower chamber: 17.3 l; middle chamber: 17.7 l; upper chamber: 9.4 l. The mean distance between the drainages 3.2 and 3.1 and the particular nozzle tray 2.2 or 2.1 is 80 mm. The two drainages 3.2 and 3.1 are embedded in the layers 4.1 and 4.2 of granular polyethylene (particle size: 0.8–2 mm). The thickness of the layers of inert material is 150 mm, and the free volume of the lower chamber is 13 l and that of the middle chamber is 13.5 l. The bottom chamber is filled with 11.6 l and the top chamber with 8 l of the same strongly acid cation exchanger. The middle chamber contains 11.2 l of a strongly basic anion exchanger.

To render the filter operational, the ion exchangers are first regenerated. For this purpose, the anion exchanger is first regenerated with 18.5 l of 3% strength sodium hydroxide solution. The sodium hydroxide solution is passed in through the drainage 3.2. The regenerating agent draining out is removed through drainage 3.1, together with the stream of water (flow rate: 55 l/hour) passed in counter-current through tube 9 through the lower chamber. After the regenerating alkali has been washed out in the manner described in Example 1, the cation exchanger 7.2 is regenerated with 7 l of 9% strength hydrochloric acid. This hydrochloric acid is passed in through tube 10 and removed through the drainage 3.2 together with the stream of water (flow rate: 30 l/hour) passed in counter-current through the drainage 3.1 or tube 9. The acid draining out has a HCl concentration of 4% and is collected in tank 11. The cation exchanger is then washed out with 30 l of completely demineralised water in the course of 30 minutes. The washing water draining out is removed through drainage 3.2 together with the water passed in counter-current through drainage 3.1 or tube 9. When the washing operation has ended, the regenerating acid is passed from tank 11 through drainage 3.1 over the cation exchanger 7.1. After the regeneration, the regenerating acid is washed out by passing in pure water through drainage 3.1. Regenerating agents and washing water draining out of the cation exchanger 7.1 are removed through tube 9.

The filter regenerated in this manner is used for demineralising drinking water. The drinking water has the values mentioned in Example 1 and is passed through the filter, from the bottom upwards, at a rate of 300 l/h. Loading is ended as soon as the residual silica content in the demineralised water taken off through tube 10 has risen to 0.1 mg of $SiO_2$/l. Throughout the entire loading operation, the pure water taken off through tube 10 has a conductivity of 0.2 microsiemens/cm, a sodium concentration of 0.01 mg/l and a residual silica content of 0.02 mg/l.

EXAMPLE 6

The layer of inert material 4.1 next to drainage 3.1 is removed from the filter described in Example 5. The lower chamber is charged with 8.5 l of a macroporous strongly basic anion exchanger, the middle chamber is charged with 11.6 l of a strongly acid cation exchanger and the topmost chamber is charged with 9.5 l of a weakly basic anion exchanger. The free space between the upper edge of the anion exchanger bed and the nozzle tray in the lower chamber is about 300 mm; it is kept free for the necessary back-washing of the resin.

In order to render the filter operational, it is regenerated. Regeneration starts with the weakly basic anion exchanger in the topmost chamber. 24 l of 2% strength sodium hydroxide solution are passed through this chamber from tube 10; the regenerating agent is removed at drainage 3.2 together with the stream of water (flow rate: 30 l/hour) passed in counter-current through tube 9 through the strongly basic anion exchanger and strongly acid cation exchanger. The regenerating alkali is washed out in the same manner, that is to say the washing water is passed in through tube 10 and removed through drainage 3.2 together with the stream of water passed in counter-current through tube 9.

To regenerate the cation exchanger, 10.6 l of 6% strength hydrochloric acid are then passed in through drainage 3.2 and, after flowing through the cation exchanger, and through the anion exchanger in the bottom chamber, are removed through tube 9. Washing out with demineralised water is effected in the same manner as regeneration with the acid. Washing out is continued until the content of free acid in the washing water draining out is 3 mmols/l. This is achieved after 95 l of water have been passed through. Water is now pumped through the filter from the bottom upwards at a rate of 200 l/hour, until the conductivity of the water flowing out at 10 has fallen to below 50 microsiemens/cm. This value is reached after 30 minutes.

The filter rendered operational in this manner is used for simultaneously decolorising and demineralising a crude glucose solution. For this purpose, the solution of crude glucose (concentration of glucose: 30% by weight) is passed through the filter from the bottom upwards at a rate of 100 l/hour. As long as the conductivity of the solution leaving at 10 does not exceed 200 microsiemens/cm, the content of dyestuffs and salts in the solution is only 5% of the original dyestuff and salt content.

In the co-current filter installations which were hitherto used for the simultaneous decolorisation and demineralisation of such sugar solutions and in which the resins are accommodated in separate filters, the amounts of regenerating agents required for the same amounts and types of resin are 38 l of 2% strength sodium hydroxide solution and 19 l of 6% strength hydrochloric acid, and 17 l of solution containing 1.7 kg of sodium chloride and 340 g of NaOH are obtained as waste solutions. That is to say, the filters hitherto used require an excess of regenerating agents of 80% of hydrochloric acid and 60% of sodium hydroxide solution compared with the excess of regenerating agents used in the filter according to the invention.

What is claimed is:

1. A counter-current adsorption filter column or ion exchange column for the treatment of liquids, with different adsorbents or ion exchangers which require different regenerating agents, in which loading of the different adsorbents or ion exchangers is effected in a stream of liquid flowing upwards and regeneration of the different loaded adsorbents or ion exchangers with the different regenerating agents is effected in a stream of liquid flowing downwards, comprising the following features
   (a) that the inside of the column is subdivided, by at least two horizontal devices which are permeable to liquid, into at least three chambers corresponding to the number of different adsorbents or ion exchangers to be used;
   (b) that adsorbents or ion exchangers which are regenerated with different regenerating agents are present in adjacent chambers;
   (c) that the chambers—with the exception of the topmost chamber of the column—are equipped with a liquid drainage system which is located below the device which is permeable to liquid and forms the upper boundary of the chamber, which is embedded in a layer of inert material, and which is located in the upper fifth of the chamber; and
   (d) that the amount of adsorbent or ion exchanger (in % by volume) in the individual chambers is 50 to 98% of the free volume of the chamber.

2. The counter-current column adsorption filter of claim 1, wherein the inside is sub-divided into 3 or 4 chambers by 2 or 3 devices which are permeable to liquid.

3. The counter-current column adsorption filter according to claim 1, wherein the liquid drainage system is located in the upper seventh of the chamber.

4. The counter-current column adsorption filter according to claim 1, wherein the amount of adsorbent in the individual chambers is 60 to 95% of the free volume of the chamber.

5. The counter-current column adsorption filter according to claim 1, wherein the amount of adsorbent in the individual chambers is 75 to 95% of the free volume of the chamber.

6. The counter-current column adsorption filter according to claim 1, wherein the inert material is polyethylene granules, polypropylene granules or polystyrene granules.

7. A method of operating a counter-current adsorption filter column or an ion exchange column wherein
   (a) different adsorbents or ion exchangers are in a corresponding number of different chambers in the column defined by horizontal subdivisions;
   (b) adsorbents or ion exchangers which are regenerated with different regenerating agents are present in adjacent chambers;
   (c) the chambers—with the exception of the topmost chamber of the column—are equipped with a liquid drainage system which is located below the device which is permeable to liquid and forms the upper boundary of the chamber, and which is embedded in a layer of inert material; and
   (d) the amount of adsorbent or ion exchanger (in % by volume) in the individual chambers is 50 to 98% of the free volume of the chamber,
the method comprising
   (i) in the loading phase passing a stream of liquid to be treated from the bottom upwards through the chambers, and
   (ii) in the regenerating phase, chamber by chamber introducing a regenerating agent and wash water into the top of each chamber to be regenerated, and removing the spent regenerating agent and washing water through the liquid drainage system of the chamber below simultaneously with a stream of water which flows in counter-current to the stream of the spent regenerating agent and washing water and which is being passed from the bottom upwards through this very chamber below.

8. Method according to claim 2, wherein the stream of water to be passed in counter-current to the spent regenerating agent and washing water is passed in at a rate such that no schlieren formation occurs in the space below the layer of the inert material in which the liquid drainage system is embedded.

* * * * *